United States Patent [19]

Johannes

[11] Patent Number: 4,684,988
[45] Date of Patent: Aug. 4, 1987

[54] CIRCUIT ARRANGEMENT FOR DETECTING THE VERTICAL BLANKING PERIODS IN A PICTURE SIGNAL

[75] Inventor: Kurt J. Johannes, Hamburg, Fed. Rep. of Germany

[73] Assignee: U.S. Philips Corporation, New York, N.Y.

[21] Appl. No.: 675,153

[22] Filed: Nov. 27, 1984

[30] Foreign Application Priority Data

Dec. 1, 1983 [DE] Fed. Rep. of Germany ....... 3343455

[51] Int. Cl.⁴ .............................................. H04N 5/08
[52] U.S. Cl. ................................................... 358/154
[58] Field of Search ................ 358/154, 153, 148, 150

[56] References Cited

U.S. PATENT DOCUMENTS 4,258,389 3/1981 Sakamoto ............................ 358/154
4,459,612 7/1984 Shinkai ................................ 358/154

Primary Examiner—Tommy P. Chin
Attorney, Agent, or Firm—Thomas A. Briody; William J. Streeter; Gregory P. Gadson

[57] ABSTRACT

A circuit for detecting the vertical blanking period in a picture signal, having a pulse interval detector and a subsequent pulse shaping stage. A composite synchronizing signal, which contains pulses in a predetermined sequence, is applied to the pulse interval detector. The pulse interval detector supplies an output signal change when the interval between the pulses falls short of a predetermined time threshold. The output signal is applied to the pulse shaping stage which, in response thereto, produces a vertical synchronizing signal. With such a circuit arrangement, a vertical synchronizing signal is obtained substantially without delay with respect to the composite synchronizing signal, while at the same time, the circuit design effort and cost are reduced, because of the fact that the pulse interval detector constitutes the time threshold with a predetermined multiple of a period of a periodical clock signal and that the pulse shaping stage forms the vertical synchronizing signal at the occurrence of given pulses in the sequence of pulses of the composite synchronizing signal after the occurrence of the change in the output signal.

13 Claims, 3 Drawing Figures

CIRCUIT ARRANGEMENT FOR DETECTING THE VERTICAL BLANKING PERIODS IN A PICTURE SIGNAL

BACKGROUND OF THE INVENTION

The invention relates to a circuit arrangement for detecting the vertical blanking periods in a picture signal, comprising a pulse interval detector with means for receiving a composite synchronizing signal contained in the picture signal and comprising pulses in a predetermined sequence, and means for supplying a change in its output signal when the time intervals between consecutive pulses fall short of a predetermined time threshold, and a pulse shaping stage with means for receiving the output signal and which, in response thereto produces a vertical synchronizing signal.

A picture signal, for example a television signal, as a rule contains a plurality of types of pulse-shaped synchronizing signals which are superposed on each other and on the signals which contain the picture content to form the picture signal. The total of all the superposed synchronizing signals is denoted as the composite synchronizing signal, which consists of line synchronizing pulses, alternatively denoted as the horizontal pulses, and field pulses, alternatively denoted as the vertical pulses. A horizontal pulse is inserted at the transition between two lines of the picture signal, while at the transition between two fields, usually a plurality of vertical pulses occur, the exact number of which depends on the transmission standard of the picture signal. Immediately prior to and after the vertical pulses there is a predetermined number of equalizing pulses which are designated as pre-equalizing pulses and post-equalizing pulses and are significantly narrower than the horizontal and vertical pulses.

The U.S. Pat. No. 4,258,389 discloses a circuit for recovering a vertical synchronizing signal from a composite synchronizing signal, which comprises a pulse interval test circuit with monostable multivibrators and a D-type flip-flop, and also a signal shaping circuit with monostable multivibrators. The pulse interval test circuit is preceded by a pulse width test circuit comprising monostable multivibrators and a D-type flip-flop. The pulse width test circuit samples all the pulses of the composite synchronizing signal applied thereto and produces a signal when the width of the sampled pulse falls short of three quarters of the target value of the width of the horizontal pulses. This signal is applied to the pulse interval test circuit which examines the composite synchronizing signal to check whether, at the end of a half-line period, a further pulse occurs. If so, the D-type flip-flop of the pulse interval test circuit changes state, as a result of which the monostable multivibrators of the signal shaping circuit are again driven so as to supply pulses which constitute the vertical synchronizing signal recovered from the circuit.

In the prior art circuit arrangement, the pulse width and spacings to be checked are compared with pulse-shaped signals which ae derived, without exception, from monostable multivibrators. Such multivibrators are, as regards their function, basically analog circuits which are temperature-dependent to a large extent. In the prior art circuit arrangement of a plurality of time intervals determined by monostable multivibrators because of the stringing, errors in the multivibrators may accumulate in an impermissible manner and cause faulty operation. Consequently, the circuit arrangement must be adjusted very carefully. In addition, because the capacitors are always required for the monostable multivibrators to determine their time constants, the circuit arrangement cannot, or only at high cost and design efforts, be integrated on a semiconductor wafer. Furthermore the prior art circuit arrangement produces a vertical synchronizing signal which does not coincide in time with the vertical pulses of the composite synchronizing signal.

SUMMARY OF THE INVENTION

The invention has for its object to provide a circuit arrangement of the type defined above, which does not include capacitors, does not necessitate an adjustment and which produces a vertical synchronizing signal whose time position coincides substantially accurately with the time position of the vertical pulses.

The invention provides a circuit arrangement of the above-mentioned kind, wherein the pulse interval detector comprises means for forming the time threshold from a predetermined multiple of periods of a periodic clock signal applied thereto, while the pulse shaping stage comprises means for forming the vertical synchronizing signal at the occurrence of predetermined pulses in the pulse sequence of the composite synchronizing signal after the change in the output signal of the pulse interval detector has occurred.

The invention is based on the recognition that errors may be produced during the generation of a vertical synchronizing signal from the composite synchronizing signal, especially by comparing the composite synchronizing signal with a time standard produced independently thereof, for example the length of pulses produced with monostable multivibrators. On the other hand, the vertical synchronizing signal has a predetermined shape as a function of time, so that the vertical synchronizing signal can be derived immediately and consequently without time delays from the vertical pulses themselves. The composite synchronizing signal then constitutes, itself, the time standard for the generation of the vertical synchronizing signal.

In the circuit arrangement according to the invention, only one independently produced time standard is used for the detection of the pulse intervals, and, more specifically, for the purpose of timely detecting the occurrence of vertical pulses, the time-intervals between the sequential pulses in the composite synchronizing signal are compared with a time threshold, which is derived from a clock signal of a stable frequency. Such clock signals are available in all types of circuit arrangements for processing picture signals within the scope of which the circuit arrangement according to the invention is used. Deriving a time standard for the detection of pulse intervals is therefore simple and accurate in the circuit of the present invention. After a detection of a small pulse interval in the composite synchronizing signal, given pulses are selected from the sequence of pulses contained therein to produce the vertical synchronizing signal; this composite synchronizing signal is consequently directly used as the time standard.

The occurrence of an interval between the pulses of the composite synchronizing signal, which interval is reduced to half the original distance compared with a normal line period, indicates, for example, in a picture signal in accordance with the PAL or the NTSC-standard, the beginning of the train of pre-equalizing pulses.

The invention now makes advantageous use of the accurately determined sequence of, for example in the PAL or NTSC standard, pre-equalizing pulses, vertical pulses and post-equalizing pulses. The same holds for all the (picture) signals containing pulses, for which, signals a train of pulses which compared with the intervals between the remaining pulses, have reduced intervals which must be detected, and a (vertical synchronizing) signal with an accurately determined position in time relative to the pulse train must be generated. Since a given pulse, for example, the first vertical pulse, always occurs in the same position in the predetermined pulse sequence, it is sufficient, after the first pre-equalizing pulse has been detected, to have the beginning of the vertical synchronizing signal to be generated starting with, for example, the beginning of a predetermined pulse of the pulse sequence, and to have it end with the end of a further predetermined pulse of the pulse sequence, without investigating again which type of pulse from the composite synchronizing signal is involved. Thus, the vertical synchronizing signal to be generated can be recovered without any delay, with the exception of some gate delay times. Consequently, the circuit arrangement can be used for real-time processing of a picture signal and of the composite synchronizing signal contained therein, for example, for digital processing of the picture signal.

In accordance with an embodiment of the invention, the pulse shaping stage comprises a first counting device for counting the pulses in the composite synchronizing signal. This provides a very simple possibility to identify the individual pulses in a predetermined sequence.

In accordance with a further embodiment of the invention the first counting device is enabled when the change in the output signal of the pulse interval detector occurs. When the pulse interval detector does not produce a change in its output signal, the first counting device is blocked. This prevents the first counting device from counting during the duration of the field, the then incoming horizontal pulses in the composite synchronizing signal and the first counting device from being consequently adjusted to an uncontrolled condition. Preferably, the first counting device can be reset to its initial position when the change in the output signal of the pulse interval detector does not occur.

In accordance with a still further embodiment of the invention, the first counting device produces the vertical synchronizing signal between two counting positions. The vertical synchronizing signal starts when a first counting position is reached and ends when a second counting position is reached. Thus, the vertical synchronizing signal is directly produced by the pulses in the composite synchronizing signal and is only slightly delayed relative to these pulses, the delay only amounting to an internal signal delay time of the first counting device.

In accordance with a still further embodiment of the invention, the pulse interval detector comprises a second counting device for counting the periods of the clock signals and for supplying a signal change when a predetermined counting position, corresponding to the time threshold, is exceeded. With a aid of a counter, a time interval can be derived in a simple and accurate manner from a clock signal when it corresponds to a predetermined multiple of the duration of a period of the clock signal. The second counting device can be of a very simple construction when the signal change supplied by it constitutes the carry signal after the highest possible counting position has been reached.

The circuit arrangement according to the invention does not comprise monostable multivibrators, is of a simple construction and consequently easily integrable on a semiconductor wafer. It can be entirely formed from digital circuit components and can therefore be advantageously included in, for example, the assembly of digital video signal processing circuits.

In accordance with a still further embodiment of the invention, the second counting device is reset to its initial position by the pulse of the composite synchronizing signal. It then starts counting again from its initial position at each pulse of the composite synchronizing signal. As a result thereof, a new check of the interval between two consecutive pulses is started again in a simple way at the occurrence of each pulse in the composite synchronizing signal.

In accordance with a still further embodiment of the invention, the periods of the clock signal applied to the second counting device between its initial position and the counting position from which it supplies the signal change, form a time interval which amounts to at least a half-line period and to not more than a whole line period of the picture signal. When, for example, N is the number of periods of the clock signal, T a period duration and Z the line period of the picture signal, that is the spacing in time, of two consecutive (horizontal) pulses, then the following formula is valid (x being the signal indicating that multiplication is effected)

$$(\tfrac{1}{2}) \times Z < N \times T < Z.$$

In this way it is ensured that during the field, when consecutive horizontal pulses follow each other spaced by a whole line period, a signal is supplied by the second counter between every two horizontal pulses. When, in contradistinction therewith, the pulse interval during the period with the pre-equalizing pulses, the vertical pulses and the post-equalizing pulses amount to a half-line period of the picture signal, the second counting device does not supply a signal, as between two pulses it does not reach the corresponding counting position.

In accordance with a still further embodiment of the invention the pulse interval detector further comprises a switching stage to which the signal change from the second counting device is applied and which forms therefrom the change in the output signal of the pulse interval detector. Consequently, when the signal change of the second counting device fails to appear, this switching stage forms the output signal change of the pulse interval detector and ends it when after the last post-equalizing pulse, the second counting device supplies a signal again.

In accordance with a still further embodiment of the invention, the switching stage comprises a first bistable element with a signal input for receiving the signal change from the second counting device, a switching input for receiving the composite synchronizing signal and an output for supplying a signal comprising at least two switching states, which signal is changed from a first into a second switching state when a signal change of the second counting device has occurred at the beginning of a pulse of the composite synchronizing signal. This first bistable element is advantageously in the form of a bistable multivibrator and consequently forms a simple, fully integrable digital circuit portion. The change in the output signal of the pulse interval detector is derived from the signal at the output of the first bistable element.

In accordance with a still further embodiment of the invention, in a circuit arrangement of the type mentioned in the preamble for a picture signal which alternately contains consecutive fields of first and second types according to the composite synchronizing signal, the pulse interval detector has an input for receiving a switching signal, which is characteristic of the field type, for adapting the time position of its output signal to the composite synchronizing signal. For example, in picture signals transmitted in accordance with the PAL system, the distance between the last horizontal pulse and the first pre-equalizing pulse has a duration of a whole line period of the picture signal for fields of the first type, but for fields of the second type, it has a duration of only a half-line period. When such a composite synchronizing signal is processed, the pulse interval detector will then determine the distance between the first and second pre-equalizing pulse for the fields of the first type, but for the fields of the second type, it determines the distance between the last horizontal pulse and the first pre-equalizing pulse. The switching signal corrects this difference in such a way that the pulse shaping stage utilizes in each field, the same pulses to form the vertical synchronizing signal.

To that end, for example, in accordance with a still further embodiment of the invention, the switching signal is applied to the switching stage which, in response thereto, is changed-over such that the output signal of the pulse interval detector always occurs in the same position in time, with respect to a predetermined pre-equalizing pulse. The first counting device is then always incremented to the correct position in time, relative to the pulses of the composite synchronizing pulse.

In accordance with a still further embodiment of the invention, the switching stage comprises a second bistable element with a signal input for receiving the signal from the output of the first bistable element, a switching input for receiving the composite synchronizing signal, a setting input for receiving the switching signal, and an output for supplying a signal comprising at least two switching states and corresponding to the state of the signal at the signal input at the beginning of each last pulse of the composite synchronizing signal, the switching stage also including a gate circuit with an AND function whose inputs are connected with the outputs of the bistable elements to form, at its output, the output signal of the pulse interval detector. By implementing the circuit arrangement according to the invention in this way, it is accomplished in a simple manner that the output signal of the pulse interval detector is always produced in the same position in time, relative to the pulses in the composite synchronizing signal.

DESCRIPTION OF THE DRAWINGS

An embodiment of the invention will now be described in greater detail, by way of example, with reference to the accompanying drawings, in which.

DESCRIPTION OF THE PREFERRED EMBODIMENT

Figure 1:
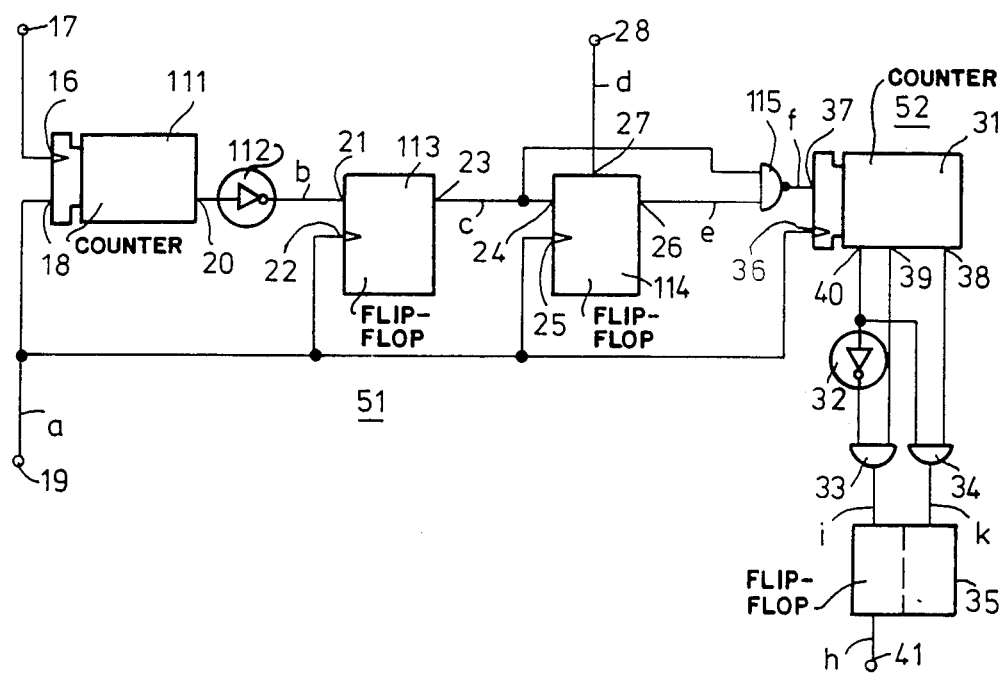
FIG. 1 shows a block diagram of a circuit arrangement according to the invention.

FIG. 1 shows an example of a circuit arrangement of the invention formed by a pulse interval detector 51 and a pulse shaping stage 52. The pulse interval detector 51 comprises a second counter 111, an inverter 112 and a switching stage formed by first and second bistable elements implemented as flip-flops 113, 114 and a NAND-gate 115. The pulse shaping stage 52 comprises a first counter 31 and also a decoding stage formed by a second inverter 32, two AND-gates 33, 34 and a flip-flop 35.

The second counter 111 of the pulse interval detector 51 has a counting input 16 connected to a clock signal input 17 via which a periodic clock signal is applied to the circuit arrangement. In addition, the counter 111 has a resetting input 18, which is connected to an input 19 of the circuit arrangement for receiving the composite synchronizing signal. The counter 111 counts the cycles of the periodic clock signal applied to its counting input 16 and is reset at regularly spaced intervals to a starting position by the pulses of the composite synchronizing signal applied to its resetting input 18. In addition, the counter 111 has a carry output 20 at which a carry signal appears when, during up-counting by the counter 111, a predetermined count is exceeded.

Figure 2:
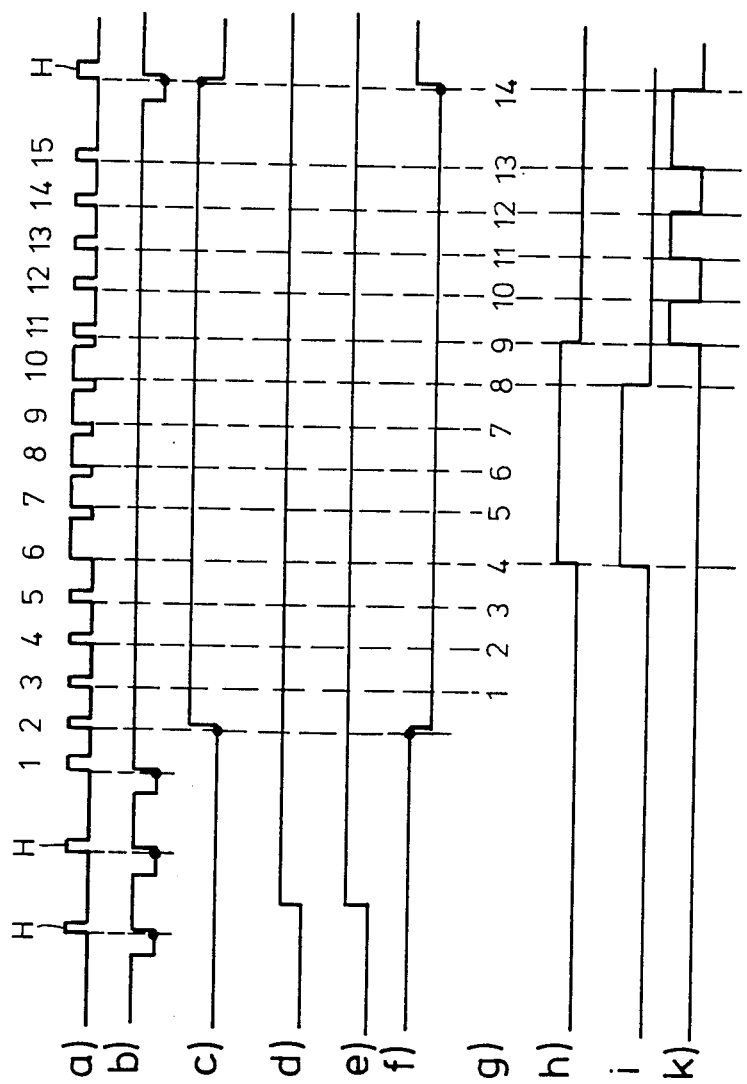
FIG. 2 shows signal variations in the circuit arrangement of FIG. 1 during a field of a first type.

To explain the operating mode of the circuit arrangement shown in FIG. 1, FIGS. 1 and 2 show some signal variations occurring therein which relate, for example, to a picture signal in accordance with the PAL-standard. Corresponding signal variations are also obtained for picture signals in accordance with other standards (for example NTSC, SECAM). FIG. 2 illustrates the signal variations during the vertical blanking period of a field of a first type. FIG. 2a shows the composite synchronizing signal then produced. FIG. 2a shows the last two horizontal pulses H before the vertical blanking period which are produced during the field, spaced by a line period, and which are followed, after a whole line period, by the first pre-equalizing pulse. In the vertical blanking period, a total of five pre-equalizing pulses, five vertical pulses and five post-equalizing pulses occur, in this succession, each being spaced by a half-line period. In FIG. 2a these pulses are numbered from 1 to 15. The composite synchronizing signal of FIG. 2a is applied to the input 19 in FIG. 1.

With, for example, a picture signal in accordance with the PAL standard, for which a line period has a duration of 64 μs, the chrominance sub-carrier, having a frequency of approximately 4.43 MHz, is preferably used as the periodic clock signal. The counter 111 is then constructed as an eight-position counter, so that at the output 20, a signal change occurs when the counter 111 has counted, starting from its initial position, 256 periods of the clock signal (chrominance sub-carrier). This time threshold N×T which has a number N of 256 periods and a period interval T of the clock signal of approximately 0.226 μsec, amounts to approximately 57.8 μsec, it consequently being located between the value of a half-line period, 32 μsec, and a whole line period, 64 μsec.

FIG. 2b shows the signal at the output 20 of the counter 111 in its inverted form, i.e. at the output of inverter 112 subsequent to the output 20. The signal change occurs in the second half of the interval between two horizontal pulses, i.e. the line period, and ends when the subsequent pulse resets the counter 111 to its starting position via the resetting input 18. This procedure is also effected when the counter 111 is reset to its initial position by the first pre-equalizing pulse. The counter 111 then starts counting, as it does after each pulse in the composite synchronizing signal, the periods of the clock signal, not shown. As now the next pulse, the second pre-equalizing pulse, arrives already after a half-line period, the counter 111 is already reset before it can apply a signal change to its output 20. Consequently, as is shown in FIG. 2b, the signal at the output of the inverter 112 remains at a high level until after the last post-equalizing pulse (the 15$^{th}$ pulse in the vertical blanking period shown in FIG. 2a), a distance of one line period, until the subsequent horizontal pulse has occurred again.

The first flip-flop 113 in the present embodiment is a D-type flip-flop which has a D-input 21, a switching input 22 and an output 23. The D-type flip-flop 113 has for its function to store and make available at the output 23 the signal at the D-input 21, each time, at the instant at which the signal at the switching input 22 has an ascending edge. The D-input 21 of the flip-flop 113 is connected to the output of the inverter 112 and the switching input 22 is connected to the input 19 for the composite synchronizing signal. When, during a field, a signal change occurs at the output 20 of the counter 111 in the last portion of an interval between two horizontal pulses, the output of the inverter 112 is still at a low potential because of the signal delay time through the counter 111 and the inverter 112 while the ascending edge of the subsequent pulse is already present at the switching input 22. As a result thereof, the output 23 of the flip-flop 114 remains at a low potential during the whole field, i.e. as long as there is a signal at the output 20.

This situation does not change until the second pre-equalizing pulse has been applied, as during the ascending edge of this pre-equalizing pulse a high potential is now present for the first time at the D-input of the flip-flop. A high potential then also occurs at the output 23 of the flip-flop 113. FIG. 2c illustrates the signal variation at the output 23 of the flip-flop 113. To explain the effect of the signal delay times, the time intervals between the ascending edges of the signals are shown on an enlarged scale in FIG. 2. The output 23 of the first flip-flop 113 remains at a high potential until the first horizontal pulse after the last post-equalizing pulse has occurred after a whole line period, and is then again switched to a low potential.

The signal from the output 23 of the flip-flop 113 is further applied to a D-input 24 of the second flip-flop 114, which is also a D-type flip-flop and whose switching input 25 is connected to the input 19 for receiving the composite synchronizing signal. Consequently, the second flip-flop 114 stores the value of the signal from output 23 of the first flip-flop 113, which is always present at the instant at which an ascending edge occurs in the composite synchronizing signal, and supplies this signal from an output 26.

In addition, the second flip-flop 114 has a setting input 27. The signal applied thereto has, for setting the flip-flop 114, priority over the signals applied to the D-input 24 and the switching input 25. The setting input 27 is connected to an input 28 of the circuit arrangement for applying a switching signal which is characteristic of the fields of the first and second types, respectively. During the vertical blanking periods associated with the fields of the first type, the switching signal has a high potential and during the vertical blanking period associated with the fields of the second type it has a low potential. For a high potential at the setting input 27, there fundamentally appears a high potential at the output 26 of the second flip-flop 114, while for a low potential at the setting input 27 the potential at the output 26 is determined by signal sequences at the inputs 24, 25.

FIG. 2d shows the switching signal for a field of the first type and FIG. 2e shows the signal at the output 26 of the second flip-flop 114 for this case.

The signal from the output 26 of the second flip-flop 114 is applied to a first input of the NAND-gate 115, whose second input receives the signal from the output 23 of the first flip-flop 113. The signal at the output of the NAND-gate 115 constitutes the output signal of the pulse interval detector 51. It is shown in FIG. 2f for a field of the first type, and forms a negative pulse, whose leading edge is triggered by the leading edges of the second pre-equalizing pulse and the trailing edge by the leading edge of the horizontal pulse, which follows after the last post-equalizing pulse.

Figure 3:
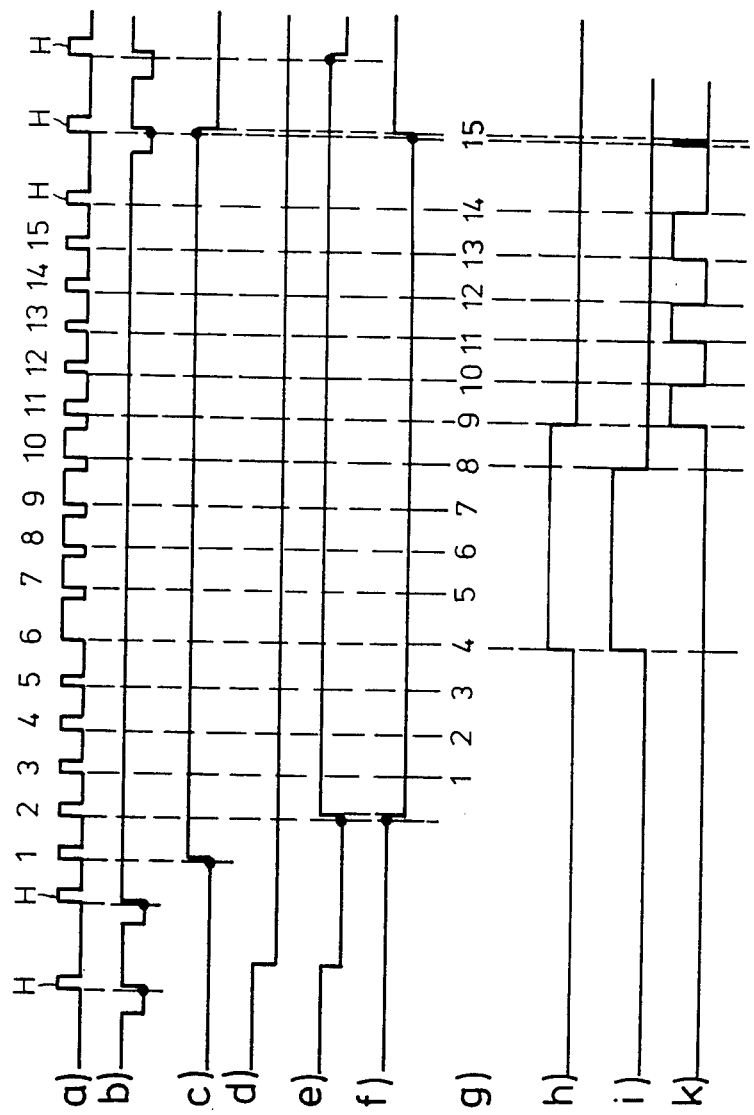
FIG. 3 shows signal variations in the circuit of FIG. 1 during a field of a second type.

FIG. 3 shows the signal variation at the occurrence of a field of the second type, again for an example of a picture signal in accordance with the PAL-standard. The first pre-equalizing pulse in the vertical blanking period follows the last horizontal pulse already after a half-line period. This is shown in FIG. 3a. Pre-equalizing pulses, vertical pulses and post-equalizing pulses are numbered again from 1 to 15, as in FIG. 2a. The horizontal pulses are denoted by H.

Contrary to the embodiment shown in FIG. 2, the signal change at the carry output 20 of the counter 111 is already absent before the first pre-equalizing pulse so that a change to a high potential occurs already at the occurrence of the first pre-equalizing pulse at the output 23 of the first flip-flop 113. In correspondence therewith, a length of a whole line period is not obtained until the interval between the first and second horizontal pulses after the vertical blanking period, so that a signal change does not occur at the output 20 of the counter 111 until before the second horizontal pulse after the vertical blanking period. In accordance therewith, the first flip-flop 113 is reset by the leading edge of the second horizontal pulse after the vertical blanking period. This is illustrated in the FIGS. 3b and 3c.

FIG. 3d shows the variation of the switching signal at the terminal 28 during the blanking period of a field of the second type. The switching signal changes between the next-to-last and the last horizontal pulse before the vertical blanking period from a high to a low potential and remains there during the total blanking period.

This switching signal enables the second flip-flop 114. The signal at the output 26 thereof is first changed to a low potential by the switching signal, as is shown in FIG. 3e. During the leading edge of the last horizontal pulse and of the first pre-equalizing pulse, the output 23 of the first flip-flop 113 is still at a low potential, so that also the potential at the output 26 of the second flip-flop 114 still has a low value. The potential at the output 26 of the second flip-flop 114 is not switched to a high potential until the occurrence of the leading edge of the second pre-equalizing pulse, during which the signal at the output 23 now has a high potential. The output 26 remains at the high potential as long as the potential of the signal at the output 23 of FIG. 3c is still high during the subsequent ascending edge in the composite synchronizing signal of FIG. 3a. The potential at output 23 is not at a low value again until the instant at which the leading edge of the third horizontal pulse after the vertical blanking period occurs so that the potential at the output 26 is not switched back to a low value until after the occurrence of this leading edge.

The output signal of the pulse interval detector shown in FIG. 3f then appears at the output of the NAND-GATE 115 for a field of the second type. It has the shape of a negative pulse whose leading edge is triggered by the leading edge of the second pre-equalizing pulse and whose trailing edge is triggered by the leading edge of the second horizontal pulse after the vertical blanking period. The leading edge of the output signal of the pulse interval detector 51 is consequently located at the leading edge of the second pre-equalizing pulse for both types of fields.

The pulse-shaping stage 52 comprises the first counter 31, whose counting input 36 is connected to the input 19 for the composite synchronizing signal and whose resetting input 37 is connected to the output of the NAND-gate 115. In accordance therewith, the first counter 31 is set to its starting position and locked there for the duration of each field. The first counter 31 is not enabled again until the leading edge of the second pre-equalizing pulse occurs, i.e. at the change of the output signal of the pulse interval detector 51, and counts the leading edges of the pulses of the composite synchronizing signal arriving thereafter at the input 19. The counting positions of the first counter 31 are shown symbolically in the FIGS. 2g and 3g for the two described, respective types of field. The first counter 31 is preferably in the form of a binary counter which from its output supplies signals which represent multi-digit binary numbers. In the present example, the first counter 31 has four positions.

The first counter 31 has its output 38, which carries the first, most-significant position, and the output 40, which carries the fourth least-significant position, each connected to an input of the AND-gate 34, while the output 39, which carries the third position with the most-significant value but one is connected to an input of the AND-gate 33. The output 40 is also connected to a further input of the AND-gate 33 via the second inverter 32. The outputs of the AND-gates 33, 34 are each connected to an input of the flip-flop 35.

On counting the pulses of the composite synchronizing signal in the vertical blanking period in accordance with the numerical sequences shown symbolically in FIGS. 2g and 3g, the signals shown in FIG. 2k or 3k, respectively, are formed at the output of the AND-gate 34 from the signal supplied from the outputs of the first counter 31, while at the output of the AND-gate 33, signals as shown in FIGS. 2i and 3i occur. These signals are formed as positive pulses during the vertical blanking period. The flip-flop 35 is switched by positive leading edges at the output of the AND-gate 33 into a state in which it supplies a high potential from its output 41, while it is switched by ascending edges in the signals at the outputs of the AND-gate 34 into a state in which it supplies a low potential from its output 41. As a result thereof a signal is produced at the output 41, whose variation is shown in the FIGS. 2k and 3k, respectively. The signal constitutes a positive pulse, whose leading edge is delayed only for a time corresponding to the signal delay time from the counting input 36 of the first counter 31 to the output 41 of the flip-flop 35, i.e. some nanoseconds, with respect to the leading edge of the first vertical pulse in the composite synchronizing signal and whose trailing edge is in a corresponding time relationship with the leading edge of the first post-equalizing pulse.

The embodiment described in the foregoing relates to a circuit arrangement for processing a composite synchronizing signal from a picture signal in accordance with the PAL-standard. For picture signals of other standards, for example, the NTSC-standard, similar composite synchronizing signals occur in which the numbers of equalizing pulses and vertical pulses may differ from the described example. However, the circuit arrangement according to the invention can be adapted without further measures to other pulse sequences by, for example, selecting the changed pulse sequence in accordance with different counting positions from the outputs of the first counter 31 and by adapting to each other the cycle duration of the clock signal, the counting position of the second counter 111, in which a carry signal occurs at its output 20, and the line duration in accordance with the general condition. Also the pulse width in the composite synchronizing signal can be changed without influencing the mode of operation of the circuit arrangement according to the invention. The only condition for the pulse sequence applied to the circuit arrangement is that the intervals between consecutive pulses lie below a given time threshold before the instant to be detected.

What is claimed is:

1. A circuit for detecting vertical blanking in a picture signal, comprising a pulse interval detector for receiving a composite synchronizing signal in said picture signal containing a plurality of consecutive pulses in a predetermined sequence during a vertical interval of said picture signal, means for measuring time intervals between said consecutive pulses, said means for measuring forming an output signal during time intervals between said consecutive pulses which fall short of a predetermined time threshold, said time threshold equals to a predetermined number of periods of a periodic clock signal, and a pulse shaping means for receiving said output signal from said pulse interval detector, said pulse shaping means comprising means for detecting said sequence of pulses of said composite synchronizing signal, said means for detecting being enabled by said output signal of said pulse interval detector, and means responsive to said detecting means for producing a vertical synchronizing signal.

2. A circuit as claimed in claim 1, wherein said pulse shaping means comprises a pulse shaping means counter having one input for receiving said composite synchronizing signal for counting the predetermined sequence of pulses therein.

3. A circuit as claimed in claim 2, wherein said pulse shaping means counter has another input connected to said output signal of said pulse interval detector and is enabled by said output signal of said pulse interval detector.

4. A circuit as claimed in claim 2 or 3, wherein said producing means comprises said pulse shaping means counter for producing the vertical synchronizing signal between two counting positions thereof.

5. A circuit as claimed in claim 2 or 3, wherein said pulse interval detector comprises a pulse interval detector counter for counting the periods of the periodic clock signal and for suppling a first signal which is complementary to said output signal when a predetermined counting position corresponding to said time threshold is exceeded.

6. A circuit as claimed in claim 5, wherein said pulse interval detector counter is reset by said consecutive pulses in the predetermined sequences of pulses of the composite synchronizing signal.

7. A circuit as claimed in claim 6, wherein the periods of the periodic clock signal applied to said pulse interval detector counter between its initial position and the counting position from which it supplies the output signal, are for a time interval of at least a half-line period and no more than a whole line period of the picture signal.

8. A circuit as claimed in claim 5, wherein said pulse interval detector further comprises a switching means connected to the output of said pulse interval detector counter and forming the output signal of said pulse interval detector.

9. A circuit as claimed in claim 8, wherein said switching means comprises a first bistable element having a signal input for receiving said first signal from said pulse interval detector counter, a switching input for receiving said composite synchronizing signal and an output for supplying a second signal having at least two switching states, said second signal being changed from a first switching state to a second switching state when the first signal of the pulse interval detector counter has occurred at the beginning of a pulse of the composite synchronizing signal.

10. A circuit as claimed in claim 9, for a picture signal which alternately contains consecutive fields of first and second types corresponding to the composite synchronizing signal, wherein said pulse interval detector further comprises an input for receiving a switching signal characteristic of the field type and said switching signal determines the time position of the output signal relative to the composite synchronizing signal.

11. A circuit as claimed in claim 10, wherein the switching signal is applied to said switching means.

12. A circuit as claimed in claim 11, wherein said switching means further comprises a second bistable element having a signal input for receiving said second signal from the output of said first bistable element, a switching input for receiving the composite synchronizing signal, a setting input for receiving the switching signal, an output for supplying a third signal of at least two switching states corresponding to the state of the signal at the signal input at the beginning of each subsequently occurring pulse of the composite synchronizing signal, and said switching means further comprises a logical NAND gate circuit having inputs connected to the outputs of the first and second bistable elements to form the output signal of said pulse interval detector.

13. A circuit for detecting vertical blanking in a picture signal comprising a pulse interval detector, said detector comprising a counting means having a first input for receiving a composite synchronizing signal in said picture signal containing a plurality of consecutive pulses in a predetermined sequence during a vertical interval of said picture signal, a second input for receiving a predetermined multiple of periods of a periodic clock signal, for forming a predetermined time threshold; said counting means producing an output signal, for time intervals between said consecutive pulses which are shorter than said predetermined time threshold, means for receiving said output signal of said counting means and a subsequent pulse contained in said composite synchronizing signal forming an output signal of said pulse interval detector, and a pulse shaping means comprising another counting means having a first input for receiving said composite synchronizing signal and counting said predetermined sequence of pulses therein, and a second input for receiving said output signal from said pulse interval detector, whereby a vertical synchronizing signal is produced corresponding to the duration of said output signal of said pulse interval detector.

* * * * *